Patented May 25, 1954

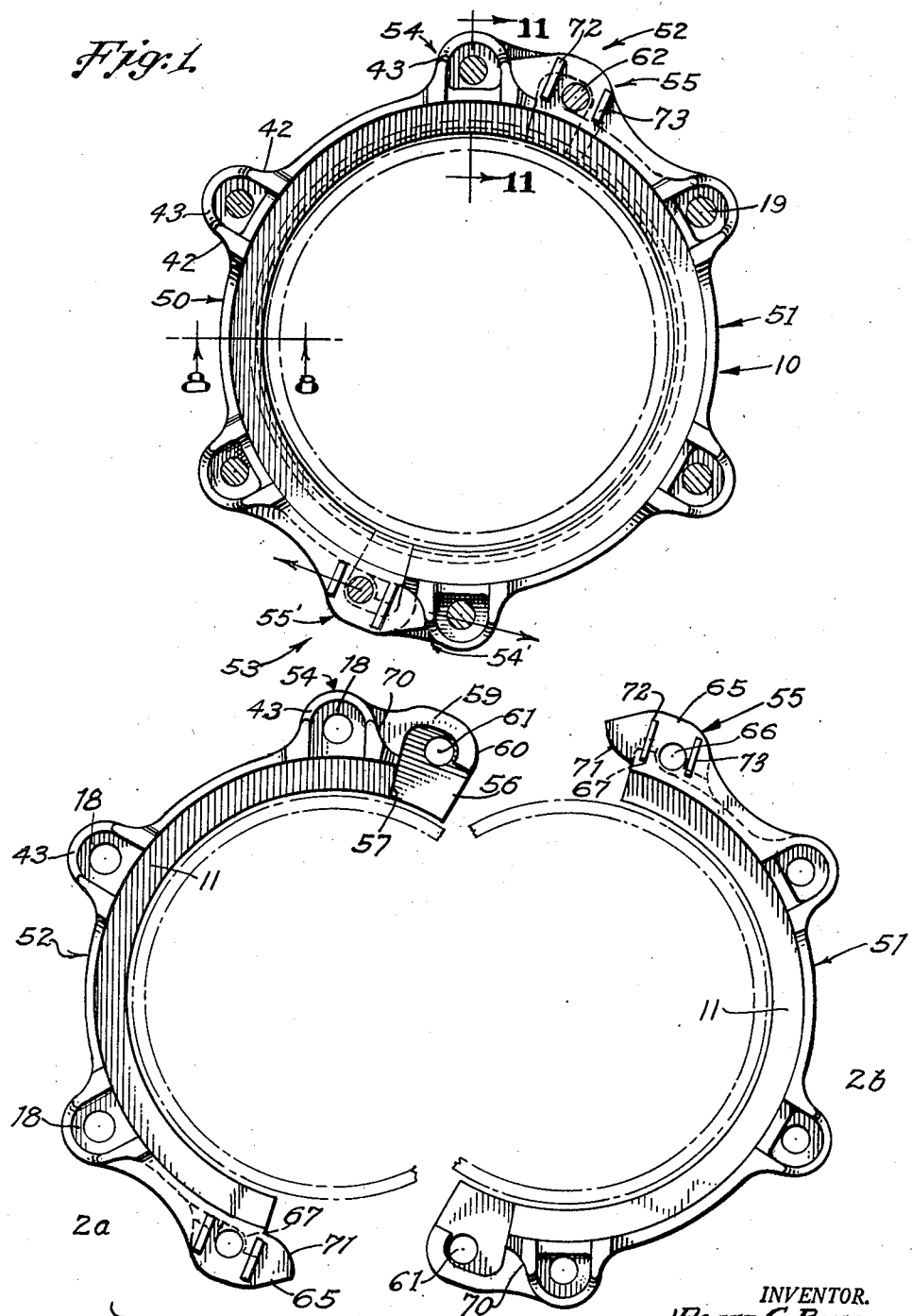

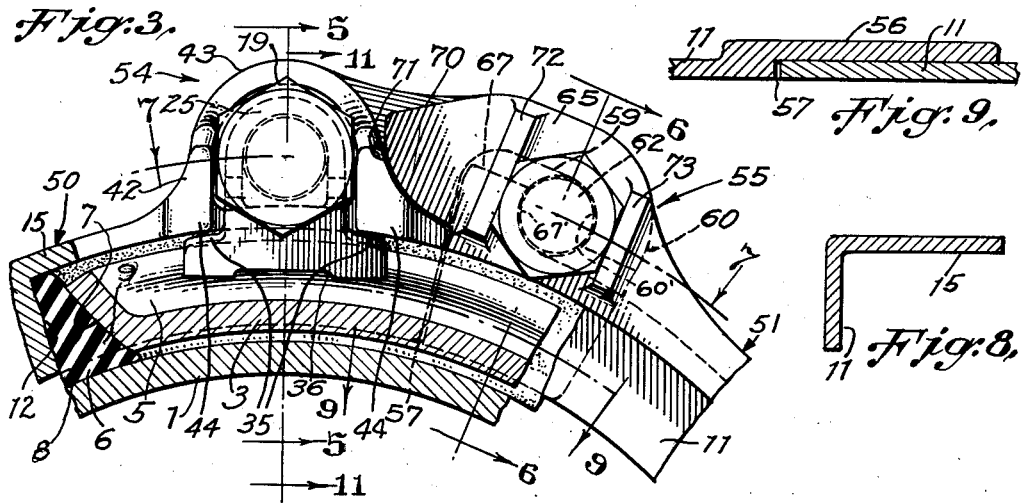
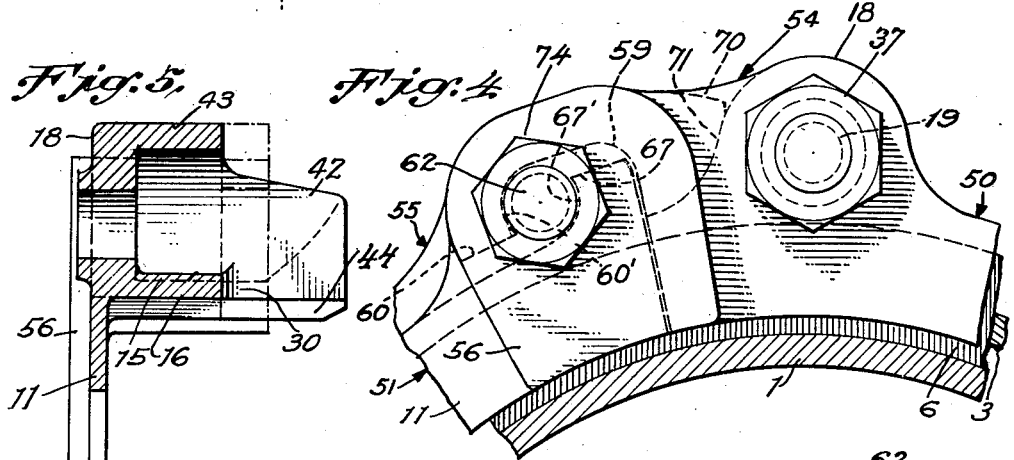
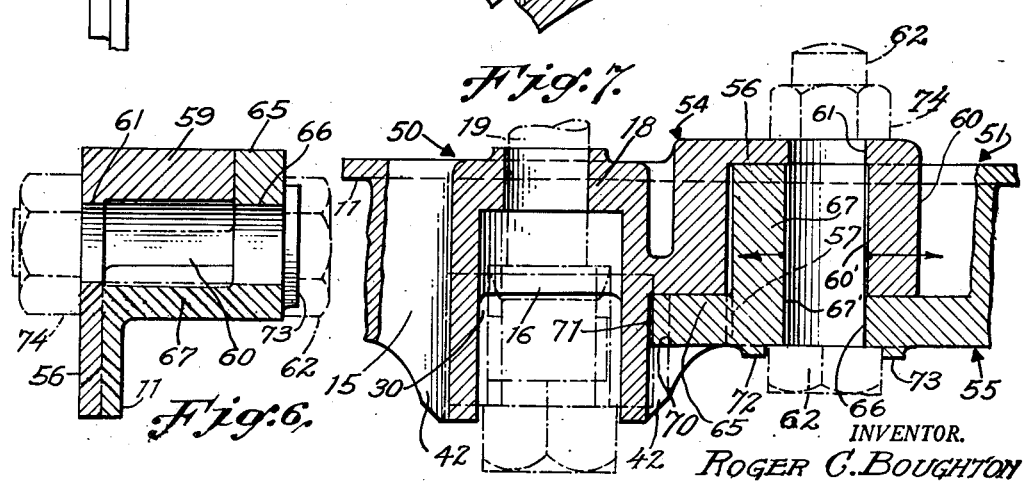

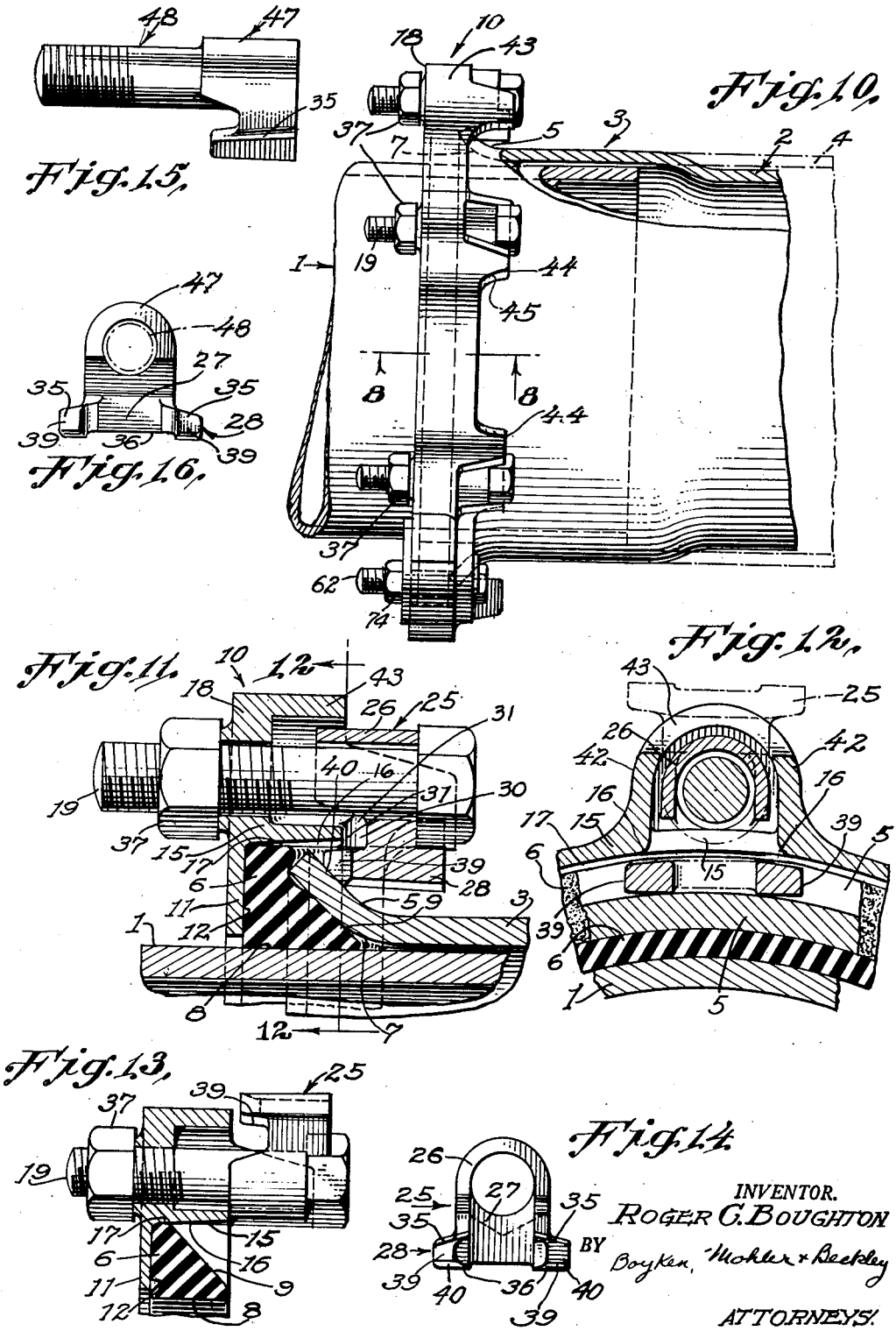

2,679,410

UNITED STATES PATENT OFFICE 2,679,410

BELL AND SPIGOT JOINT AND SEALING CLAMP

Roger C. Boughton, Los Angeles, Calif., assignor, by mesne assignments, to Southern Pipe & Casing Co., a corporation of California Application October 7, 1950, Serial No. 189,036

7 Claims. (Cl. 285—119)

This invention relates to a sealing clamp for a bell and a spigot pipe joint and more particularly to a joint which is sealed by a resilient gasket without the use of oakum or other caulking compound.

One of the objects of the invention is the provision of improved couplings and fittings for use in pipe lines, and which couplings and fittings are more economical than heretofore and simpler to install.

Another object of the invention is the provision of a relatively light sealing clamp which may be employed to seal the joints of pipes carrying high pressures.

Still another object is the provision of a novel clamping member which may be loaded with higher bolting loads than heretofore possible without deformation or deflection.

Yet another object is the provision of a clamping member used in cooperation with the spigot ring bolts for insuring proper stress distribution during the gasket compressing operation.

Another object is the provision of a clamping member which may be employed on sealing clamps for different sizes of pipes thereby reducing the number of parts required for assembling pipes of different sizes.

Another object of the invention is the provision of a novel joint between adjacent segments of a split spigot ring which is stronger and more effective than joints heretofore employed.

Other objects and advantages will be apparent from the following specification and from the drawings wherein:

Fig. 1 is a side elevational view of a split spigot ring of the present invention taken from the side which engages the gasket.

Fig. 2 is a side elevational view similar to Fig. 1 but showing the sections of the ring separated but in proper relative position with respect to each other.

Fig. 3 is an enlarged side elevational view of one of the joints between the sections of the spigot ring.

Fig. 4 is an enlarged side elevational view of the joint of Fig. 3 taken from the side opposite that shown in Fig. 3.

Fig. 5 is a cross-sectional view through the bolting socket of the spigot ring.

Fig. 6 is a cross-sectional view through the joint between adjacent sections of the ring as taken along lines 6—6 of Fig. 3.

Fig. 7 is a longitudinal cross-sectional view through a joint of the spigot ring as taken along lines 7—7 of Fig. 3.

Fig. 8 is a typical cross-sectional view through the ring as taken along lines 8—8 of Fig. 1.

Fig. 9 is a cross-sectional view through the adjacent segments of the joint as taken along lines 9—9 of Fig. 3.

Fig. 10 is a side elevational view of a bell and spigot joint partly broken away and in section to show internal structure and showing the spigot ring in elevation.

Fig. 11 is an enlarged cross-sectional view through the joint as taken along lines 11—11 of Fig. 3.

Fig. 12 is a vertical cross-sectional view through the joint as taken along lines 12—12 of Fig. 11.

Fig. 13 is a cross-sectional view through the ring showing the bolting lug in a stowed position.

Fig. 14 is an end elevational view of the bolting lug taken from the end which first engages the bell.

Fig. 15 is a side elevational view of a modified form of clamping means in which the bolting lug is combined with a stud.

Fig. 16 is an end elevational view of the element of Fig. 15.

The invention is adapted to be employed with a modified bell and spigot joint for connecting pipes 1 and 2. The pipe 2 is provided with a bell end 3 for receiving the end of the spigot pipe 1 (Fig. 10).

The pipe 2 is generally of the same diameter as the pipe 1 except for the bell portion 3. However, the pipe 2 is often the same diameter throughout its length as the bell portion 3 as indicated by dot-dash lines 4 (Fig. 10). In this latter case pipe 1 may be nested within pipe 2 thereby effecting a saving in transportation cost. In any event, it will be apparent that the present invention is equally applicable to the conventional type of bell and spigot pipes and the nested type.

The bell portions of such joints are generally provided with an enlarged end having a greater wall thickness than the remainder of the bell for providing a shoulder against which the clamping elements of the securing means may be abutted. However, for the purposes of the present invention, I prefer to provide the bell portion 3 with a flared end 5 having the same wall thickness as the remainder of the bell. In this manner the entire piping system may be formed from conventional pipe lengths of uniform cross-section and then belled and swaged to the form shown in the drawings.

The flared end portion 5 is preferably formed so that it makes an angle of 45° with the axis of the pipe (Fig. 11). All pipes regardless of size may be flared in this way thus providing for uniformity which is desirable as will be illustrated later on in more detail.

An annular gasket 6 of suitable resilient material such as rubber composition surrounds the spigot pipe 1 and is adapted to engage the axially and inwardly facing surface 7 of the flared end 5 of bell 3. Thus the gasket 6 is formed with radially inwardly facing surface 8 (Fig. 13) for engaging the spigot pipe 1 and an axially and outwardly facing surface 9 slantingly disposed with respect to the surface 8 for engaging the complementarily formed surface 7 of the flared end 5.

A spigot ring, generally designated 10, may be positioned around the spigot pipe 1 before the latter is inserted into the bell 3. This spigot ring 10 comprises a radially disposed annular web 11 which is adapted to engage the axially directed surface 12 on the side of gasket 6 opposite the slanting side 9.

Integral with web 11 and generally perpendicular thereto is a circular flange 15, having a radially inwardly facing surface 16 (Fig. 13) for engaging the radially outwardly facing surface 17 of gasket 6.

Extending radially outwardly from the flange 15 at spaced points around the periphery of flange 15 are a plurality of bolt lugs 18 which are formed integral with the web 11. These lugs 18 are apertured to receive bolts 19 which are adapted to extend axially of the pipes 1, 2 for supplying the necessary load for compressing gasket 6.

Bolts 19 engage separate clamping elements generally designated 25 which in turn engage the flared end 5 of the bell 3 for compressing the gasket 6 between said end and web 11 of the spigot ring.

Each clamping element 25 comprises a hollow U-shaped portion 26 for receiving the bolt 19 and an endwall 27 which is integral with the opposed sides of portion 26 and which cooperates with said sides for spacing bolt 19 from a base portion generally designated 28. When the element 25 is bolted to the spigot ring the said base portion 28 is positioned radially inwardly of flange 15 (Fig. 11).

The U-shaped portion 26 preferably extends along the length of bolt 19 a distance equal to about 1½ diameters of said bolt (Fig. 11) for the purpose of aligning the member 25 with respect to the pipes 1 and 2 in a manner which will be described later on in more detail.

The flange 15 is provided with an axially opening recess 30 (Figs. 5, 11) along the side opposite that to which the lug 18 is secured. This recess 30 permits the clamping element 25 to be moved in a direction axially of the bolt 19 toward lug 18. The side walls of U-shaped portion 26 of clamping element 25 are also recessed as at 31 to permit the U-shaped portion 26 and the base 28 to pass over the outer and inner sides respectively of the flange 15. Thus, the clamping element 25 may be moved towards the lug 18 under the influence of the bolt tension until the U-shaped portion engages the lug 18. Of course, when the gasket is in place on the spigot pipe and the clamping element installed as shown in Fig. 11, the element 25 will never engage the lug 18, but the recesses 30, 31 in the flange 15 and the clamping element 25 respectively prevent fouling of the latter during tightening of bolt 19.

The base 28 of the clamping element 25 is provided with a pair of oppositely outwardly projecting shoulders 35 for engaging the radially inwardly facing surface 16 (Fig. 5) of the flange 15. Thus it is seen that the shoulders 35 engage the flange 15 at spaced points around the inner periphery of the latter and on opposite sides of the bolt 19.

The radially inwardly facing side 16 of the flange 15 which engages the base 28 tapers slightly toward the outer surface of said flange in a direction away from the web 11. The outer surfaces of the shoulders 35 which engage said inner side 16 are complementarily formed and taper toward the inner surface 36 in a direction away from the end wall 27 (Fig. 14).

Thus when the bolt 19 is tightened by means of nut 37 on lug 18, the clamping element 25 will be moved toward the lug 18 and at the same time will be moved progressively radially inwardly because of the taper. However, it is pertinent to note that this inward movement is preferably very slight and that the longitudinal axis of the U-shaped portion 26 will be maintained parallel to the axis of pipes 1 and 2 at all times.

The end of the base 28 of clamping element 25 which is adjacent the flange 15 is provided with a pair of axially extending projections 39 on opposite sides of the center line plane of the clamping member which also corresponds with a longitudinal centerline plane of the pipes 1, 2. These projections 39 engage the flared end 5 of the bell 3 along surfaces 40 which are biased with respect to the axis of pipes 1, 2 in a similar manner as the flared end 5. As pointed out hereinbefore, the angle which the flared end 5 makes with the axis of the pipes is preferably 45° and the surfaces 40 are preferably formed to the same angle.

It will be apparent from Fig. 1 that as bolt 19 is tightened by means of nut 37 the surfaces 40 will tend to ride up on the flared end 5 of the bell 3. But at the same time, the clamping element 25 will move radially inwardly because of the tapered surface on shoulder 35 slidably engaging the surface 16 of flange 15. It will also be apparent in this connection that the forces exerted between the flange 15 and the shoulders 35 will become relatively great because of the large mechanical advantage effected by the slight taper.

It should be understood, of course, that the length of the portions of shoulders 35 in sliding engagement with the inner surface of flange 15 is great enough so that bearing pressures between the slidable parts does not become excessive. This relatively long line of contact is possible because of the recesses 30, 31 which permit relative movement between the clamping element 25 and the spigot ring 10.

To prevent deflection of the flange 15 under the pressure of the shoulders 35, I provide a pair of radially extending gussets 42 (Fig. 5) integral with flange 15 which extend generally outwardly of the latter and approximately at right angles thereto and connect with the lugs 18 on opposite sides of the bolt holes. In addition, an extension 43 is provided integral with the gussets 42 and the lugs 18 and which extends over the bolt receiving portion of the ring in the form of a downwardly opening U-shaped hood. This extension or hood 43 becomes, in effect, a continuation of the flange 15 so that the circumferential hoop stresses created in the spigot ring under load are partially resisted by said extension 43. In this manner high stress concentration are obviated.

The shape of the clamping element 25 is a very important feature of the present invention. The shoulders 35 and their wedging action with the flange 15 prevent setting up of unduly high bending stresses which would otherwise deform the bell engaging element under heavy loading of the clamping bolts.

As pointed out hereinbefore, the clamping element 25 remains parallel to the axis of the pipes 1, 2 at all times and is prevented from tilting from such a position by the shoulders 35. The length of the U-shaped portion 26 is such as to further prevent tilting of the clamping member.

To effect a smooth engagement of the clamping element 25 with the flange 15, the latter is preferably extended axially outwardly as at 44 (Figs. 3, 5, 10). Said extensions 44 are connected to the remainder of flange 15 by smooth junctures 45. By virtue of said extensions 44, sliding engagement between clamping element 25 and the inner surfaces 16 of flange 15 is achieved throughout the entire length of the shoulders 35 of clamping elements 25 which is desirable to prevent tilting of said element away from a line parallel with the axis of pipes 1 and 2. However, it should be noted that excessive bending stresses in the flange 15 is effectively prevented by the gussets 42 which connect said extensions 44 with the web 11.

In the drawings, a six bolt joint is shown (Fig. 1), but it will be obvious that additional lugs may be formed for larger sizes of pipe requiring a greater number of bolts.

An advantageous feature of the clamping elements 25 resides in the fact that these elements may be fastened to the spigot ring 10 by bolts 19 during transportation and may then be clamped against the bell end after the spigot ring has been inserted on the spigot pipe without requiring detachment of the clamping elements. This is important because of the great likelihood of workmen dropping the clamping elements 25 in sand or the like and losing them. The gasket 6 may be fastened by wire to the spigot ring 10 during storage or transportation and the clamping elements may be swung to the dotted line position of Fig. 12 after loosening the nuts 37 to permit such swinging.

When the pipe joint is to be made up the spigot ring may be passed over the open end of the spigot pipe (on a new installation) and the bell end of the adjacent pipe positioned as shown in Fig. 11. The elements 25 may then be swung from the dotted line position of Fig. 12 into the full line position without removing them from bolts 19.

In the case of a repair job when it is not possible to pass the spigot ring over the spigot pipe, the spigot ring must of course be formed in detachable segments. Such a structure will be subsequently described.

A modified form of the clamping element 25 is shown in Figs. 15, 16, wherein the clamping element 47 which is in all other respects similar to element 25 is provided with an integral stud 48 in place of bolt 19. This form, although it requires threading a casting, eliminates a part and this is desirable for this reason in some cases.

If it is desired to form the spigot ring from separable segments, I have provided a novel method of securing the adjacent ends of said segments together (Figs. 1-4 and 6, 7). In the drawings a ring having two segments 50, 51 is shown but it will be apparent that any number of such segments may be used to suit the size of the pipe. A nine bolt ring may require three segments, a twelve bolt ring four segments and so on.

Adjacent ends of the two segments illustrated are connected by joints generally designated 52, 53. The joint 52 connects the adjacent ends 54, 55 of segments 50, 51 respectively, while joint 53 connects the adjacent ends 54', 55' of said segments. Both of these joints are identical and for this reason only joint 52 will be described in detail, the construction thereof being shown generally in Figs. 1 and 2 and illustrated in detail in Figs. 3, 4, 6, 7 and 9. It will be understood in this connection that opposite ends of each segment will differ in detail and that adjacent ends of adjacent segments will be complementarily formed to make the joint. Thus, the ends 54 and 54' of the respective segments are similar to each other, and the ends 55 and 55' of the respective segments are similar to each other and complementary to the ends 54 and 54' respectively.

The adjacent ends 54, 55 of segments 50, 51 respectively overlap each other circumferentially, as best seen in Figs. 3, 4 and 6, wherein the end 54 is shown provided adjacent its end with a bolting lug 18 and hood 43 such as were hereinbefore described. The end 54 of segment 50 is provided with an extension 56 (Fig. 2) of web 11, which is axially offset to provide a shoulder 57 (Fig. 9) and is formed to receive the end portion of web 11 of segment 51. Thus the gasket engaging surfaces 12 of both segments 50, 51 are coplanar and continuous except for the relatively small space between the adjacent separable web portions.

The end 54 of segment 50 is also provided with a generally circumferentially extending relatively heavy flange 59 which is integral with extension 56 and perpendicular thereto (Fig. 6). This flange 59 is provided with an end portion 60 which extends radially inwardly from the flange 59 (Fig. 2). A hole 61 is provided in extension 56 for receiving bolt 62. A circumferentially extending flange 65 on end 55 of segment 51 overlaps circumferentially the flange 59 and its end portion 60, and is provided with hole 66 for receiving the bolt 62 for fastening the adjacent ends of the segments 50, 51 together.

This flange 65 is axially spaced from the extension 56 a distance equal to the width of the flange 59 and is adapted to engage the latter along its outer edge (Fig. 6) when the joint is made up. The end 55 of segment 51 is provided with an end portion 67 which extends axially from the flange 65 toward the extension 56, as shown in Figs. 6 and 7. The end portion 67 is complementarily formed with respect to the end portion 60 of the relatively heavy flange 59 so that when the bolt 62 is passed through holes 61, 66 these portions 60, 67 will engage the bolt 62 along opposite sides of its shank. The portion 67 may be cast integral with the flanges 65, 15 of segment 51 and is preferably formed with a concave bolt engaging surface 67' (Figs. 3, 4 and 7). In like manner the end portion 60 of flange 59 is concavely curved to provide a bolt engaging jaw means 60' (Figs. 3, 4 and 7) circumferentially spaced from and opposite the jaw means 67', in position to engage the opposite side of bolt 62. As best shown in Fig. 7, the respective end portions 60 and 67 are disposed in axially overlapping relation to each other at opposite sides of the bolt 62. It will be apparent that this structure permits the transfer of the hoop stresses between adjacent segments through the bolt 62 in a direction transversely of its length. In this connection it will be obvious to those skilled in the art that the usual high shear stresses in the bolt of the joint adjacent the flanges of the joint will be eliminated. The shear stress in the bolt 62 thus is replaced by bearing stresses which are comparatively low because of the relatively long length of the axially overlapping bolt engaging portions 60, 67. Inasmuch as the allowable bearing stress is much higher than the allowable shear stress the above described structure effectively increases the strength of the spigot ring.

The end 54 of segment 50 is formed with a generally outwardly facing concave surface 70 which may be a continuation of one of the gussets 42 (Fig. 3). The flange 65 is complementarily formed with an inwardly facing surface 71 which is adapted to engage the concave surface 70 when the joint 52 is made up. From Fig. 3 it will be apparent that any tendency of the segment 51 to swing outwardly around the bolt 62 will be effectively resisted by the engagement of the surfaces 70, 71. In addition these surfaces afford a convenient means for positioning the ends of the joint so that the bolt holes 61, 66 will register to permit insertion of bolt 62.

A pair of radially extending parallel ridges 72, 73 may be integrally cast on the flange 65 for positioning the head of bolt 62 therebetween to prevent turning. The joint may then be tightened by using one wrench only on the nut 74 (Fig. 4).

The particular structure of the joint above described results in an extremely strong spigot ring assembly and is simple from the standpoint of assembly and manufacture.

Another important advantage of the invention is that the clamping elements 25 may be identical for all sizes of pipe thus effecting a great savings in cost. This feature is best seen in Fig. 3 wherein the projections 39 on the base 28 of the clamping member are shown in engagement with the flared end 5 at spaced points around the outer periphery of the latter. Thus, the two projections 39 will always be in engagement with the bell at two points regardless of the size of the pipe used. Of course, all pipes should be flared to the same angle of 45° so that there is line contact at least between the surfaces 40 and the flared end 5. This interchangeability feature may be readily understood by considering the flared end 5 as a truncated portion of the same cone regardless of the size of pipe used. Thus the lines of action of the projections 39 against the flared end will lie in parallel planes forming a family of parabolas for different sizes of pipe.

The particular structure herein described should not be taken as restrictive of the invention since it will be apparent that minor changes may be made without departing from the scope of the invention.

I claim:

1. Clamping means for the seam closing gasket at the bell and spigot ends of pipe comprising; a spigot ring having an axially facing surface adapted to engage a side of such gasket when the latter is in seam closing position, a plurality of angularly spaced bolts carried by said ring projecting axially thereof and movable axially of said ring for movement of the projecting ends of said bolts toward said ring when said bolts are tightened; a separate clamping member on the projecting end of each bolt movable therewith toward said ring, each clamping member having an element integral therewith spaced radially inwardly of the corresponding bolt and projecting toward said ring, said ring having axially projecting means thereon rigid therewith and spaced radially inwardly from each bolt and positioned for slidable engagement with the radially outwardly facing side of each of said elements when said bolts are tightened, said clamping members being movable axially relative to the bell, and each of said clamping members having a bell engaging surface positioned radially inwardly of the surface on each element that is engageable with said means, for engaging said bell upon such relative axial movement.

2. Clamping means for the seam closing gasket at the bell and spigot ends of pipe comprising; a spigot ring formed with an axially projecting flange, a plurality of angularly spaced bolts carried by said ring positioned radially outwardly of said flange and projecting axially of said ring across said flange and movable axially of said ring and flange for movement of its projecting end toward said ring when said bolts are tightened, a separate clamping member on the projecting end of each bolt movable therewith toward said ring, each clamping member being movable relative to said bell and having an element spaced from the corresponding bolt radially inward thereof relative to the axis of said ring and projecting toward said ring for slidable engagement of the radially outwardly facing side of said element with the radially inwardly facing side of said flange when said bolt is tightened, and each of said elements being formed with a bell engaging surface adapted to engage the outer side of such bell when said ring is on the spigot end of such pipe with the ring against such gasket and with said bolts and said flange extending axially of the bell for said spigot end.

3. Clamping means for the seam closing gasket at the bell and spigot ends of pipe in which the bell has an outwardly flared end providing an outer surface that is inclined relative to the axis of said bell, comprising; a spigot ring adapted to encircle said spigot end for engagement with said gasket, a plurality of angularly spaced bolts carried by said spigot ring projecting axially thereof for extending across said flared end when the ring is in engagement with said gasket and the latter is in seam closing position, an element integral with said ring disposed between each of said bolts and the flared end of the bell across which said bolts are adapted to extend, and a separate clamping member on each bolt, each clamping member having an axially projecting portion integral therewith positioned to slidably engage the radially inwardly facing surface of said element when said bolts are tightened, and each clamping member having spaced bell engaging means on said axially projecting portion positioned to engage said flared end of the bell at circumferentially spaced points on the latter when said ring is on the spigot end of a pipe and in engagement with such gasket.

4. Clamping means for the seam closing gasket at the bell and spigot ends of pipe comprising: a spigot ring adapted to encircle said spigot end, having an axially facing surface adapted to engage a side of said gasket when the latter is in seam closing position and an axially projecting annular flange; a plurality of angularly spaced bolts carried by said ring outwardly of said flange and projecting axially of said ring across said flange; and a plurality of individual clamping members on the projecting ends of the respective bolts, said clamping members being separate from each other and being each movable axially relative to said bell and toward said ring; each of said clamping members having an element spaced radially inward from the corresponding bolt relative to the axis of said ring and projecting toward said ring, each such element having an outwardly facing surface positioned to engage the inwardly facing side of said flange and a bell engaging surface positioned to engage the outer side of said bell upon such relative axial movement of the clamping member.

5. Clamping means for the seam closing gasket of a bell and spigot joint comprising: a spigot ring formed of separable segments having the adjacent ends of each pair of adjacent segments in circumferentially overlapping relation relative to the axis of the ring, said overlapping ends of each such pair being provided with coaxial apertures extending parallel to the axis of the ring for receiving a bolt, one side of said ring being formed to engage said gasket when the ring is on the spigot pipe of the joint facing the bell in which said spigot pipe is fitted; a connecting bolt extending through the coaxial apertures in said overlapping ends of each pair of adjacent segments; and bolt-engaging jaw means on each of said overlapping ends between the aperture and the free end thereof, said jaw means extending toward each other axially of said apertures.

6. Clamping means for the seam closing gasket of a bell and spigot joint comprising: a spigot ring formed of separable segments having the adjacent ends of each pair of adjacent segments in circumferentially overlapping relation relative to the axis of the ring, said overlapping ends of each such pair being provided with coaxial apertures extending parallel to the axis of the ring for receiving a bolt, one side of said ring being formed to engage said gasket when the ring is on the spigot pipe of the joint facing the bell in which said spigot pipe is fitted; a connecting bolt extending through the coaxial apertures in said overlapping ends of each pair of adjacent segments; and bolt-engaging jaw means on each of said overlapping ends between the aperture and the free end thereof, said jaw means extending toward each other axially of said apertures; a plurality of circumferentially spaced clamping bolts having ends projecting axially from said one side of said ring and adapted to extend across said gasket and over said bell when said ring is on said spigot pipe; a nut on each of said clamping bolts at the opposite side of said ring for drawing its projecting end axially of the ring and generally toward the latter; and a clamping member on the projecting end of each of said clamping bolts having a portion projecting radially inwardly relative to the axis of said ring for engaging such bell at the side of the latter opposite said ring upon tightening said nut, to compress said gasket between said ring and said bell and to exert a force on said segments so tending to separate them circumferentially.

7. Clamping means for the seam closing gasket at the bell and spigot ends of pipe comprising: a spigot ring adapted to encircle said spigot end, having an axially facing surface adapted to engage a side of said gasket when the latter is in seam closing position and an axially projecting annular flange; a plurality of circumferentially spaced bolts carried by said ring outwardly of said flange and projecting axially of said ring across said flange; and a plurality of individual clamping members on the projecting ends of the respective bolts, said clamping members being separate from each other and being each movable axially relative to said bell and toward said ring; each of said clamping members having a pair of elements located at opposite sides of the corresponding bolt and radially inward from the bolt relative to the axis of said ring, said elements of each clamping member projecting toward said ring and having outwardly facing surfaces positioned to slidably engage the inwardly facing surface of said flange at circumferentially spaced positions, and bell engaging surfaces positioned to engage the outer side of said bell upon such relative axial movement of the clamping member; and said annular flange being provided with a pair of extensions projecting axially outward therefrom at opposite sides of each bolt in position to engage the outwardly facing surfaces of the respective projecting elements of the corresponding clamping member during such relative axial movement thereof.

References Cited in the file of this patent

UNITED STATES PATENTS

| Number | Name | Date |
|---|---|---|
| 696,603 | Smith | Apr. 1, 1902 |
| 753,595 | Learned | Mar. 1, 1904 |
| 1,866,619 | Carson | July 12, 1932 |
| 2,037,184 | Teetor | Apr. 14, 1936 |
| 2,076,876 | Boughton | Apr. 13, 1937 |
| 2,248,000 | Johnson | July 1, 1941 |
| 2,415,753 | Newell | Feb. 11, 1947 |
| 2,543,185 | Mathieu | Feb. 27, 1951 |

FOREIGN PATENTS

| Number | Country | Date |
|---|---|---|
| 25,001 | Australia | Feb. 5, 1930 |
| 494,735 | Great Britain | Oct. 31, 1938 |
| 572,932 | Great Britain | Oct. 30, 1945 |